(12) United States Patent
Liu

(10) Patent No.: US 10,535,345 B2
(45) Date of Patent: Jan. 14, 2020

(54) INTERACTIVE METHOD AND SYSTEM FOR GENERATING FICTIONAL STORY

(71) Applicant: Yingjia Liu, Williamsburg, VA (US)

(72) Inventor: Yingjia Liu, Williamsburg, VA (US)

( * ) Notice: Subject to any disclaimer, the term of this patent is extended or adjusted under 35 U.S.C. 154(b) by 176 days.

(21) Appl. No.: 15/789,099

(22) Filed: Oct. 20, 2017

(65) Prior Publication Data

US 2019/0122660 A1 Apr. 25, 2019

(51) Int. Cl.
| | | |
|---|---|---|
| *G10L 15/22* | (2006.01) | |
| *G10L 13/02* | (2013.01) | |
| *G10L 15/18* | (2013.01) | |
| *G06F 3/16* | (2006.01) | |
| *G10L 15/26* | (2006.01) | |
| *G06F 17/27* | (2006.01) | |

(52) U.S. Cl.
CPC ............. *G10L 15/22* (2013.01); *G06F 3/167* (2013.01); *G06F 17/27* (2013.01); *G10L 13/02* (2013.01); *G10L 15/1815* (2013.01); *G10L 15/1822* (2013.01); *G10L 15/26* (2013.01); *G10L 2015/223* (2013.01)

(58) Field of Classification Search
CPC ............................ G06F 16/258; G09B 17/006
See application file for complete search history.

(56) References Cited

U.S. PATENT DOCUMENTS

| | | | | |
|---|---|---|---|---|
| 2003/0093275 A1* | 5/2003 | Polanyi | ................ | G09B 17/003 704/251 |
| 2007/0133940 A1* | 6/2007 | Freeman | .............. | G11B 27/034 386/239 |
| 2011/0314381 A1* | 12/2011 | Fuller | ..................... | G06F 3/017 715/727 |
| 2012/0166409 A1* | 6/2012 | Saxena | ............. | G06F 16/90332 707/705 |
| 2012/0204092 A1* | 8/2012 | Stoner | ................... | G06F 3/0483 715/234 |
| 2013/0262092 A1* | 10/2013 | Wasick | ................... | G06F 17/28 704/9 |
| 2013/0323689 A1* | 12/2013 | Bates | ....................... | G09B 5/04 434/167 |
| 2014/0316764 A1* | 10/2014 | Ayan | ....................... | G10L 15/24 704/9 |

(Continued)

*Primary Examiner* — Paras D Shah
(74) *Attorney, Agent, or Firm* — Jason P. McDevitt

(57) ABSTRACT

An interactive method/system generates a fictional story. A user interface receives human speech and transmits machine-generated speech. A processor(s) is programmed to execute functions that include parsing the human speech into fragments thereof and identifying a primary fragment from the fragments wherein the primary fragment includes a verb. A generalized intent is associated with the verb and at least one object is associated with the generalized intent. The generalized intent and each object associated with the generalized intent are stored. An open-ended question is generated based on the generalized intent wherein the open-ended question is provided to the user interface for transmission as machine-generated speech. After the above steps are repeated for a number of cycles, a sequence of sentences is generated using each generalized intent and object(s) associated with the generalized intent. The sequence of sentences is transmitted as machine-generated speech from the user interface.

37 Claims, 5 Drawing Sheets

(56) References Cited

U.S. PATENT DOCUMENTS

| | | | |
|---|---|---|---|
| 2015/0165323 A1* | 6/2015 | Major | A63F 13/63 |
| | | | 463/31 |
| 2017/0278514 A1* | 9/2017 | Mathias | G10L 15/22 |
| 2017/0337841 A1* | 11/2017 | Styles | G09B 17/006 |
| 2018/0165980 A1* | 6/2018 | Kadosawa | B25J 13/00 |

* cited by examiner

INTERACTIVE METHOD AND SYSTEM FOR GENERATING FICTIONAL STORY

FIELD OF INVENTION

The field of the invention relates generally to user-interactive systems, and more particularly to a method and system that interacts with a user (e.g., a child) in order to generate a fictional story based on such interactions.

BACKGROUND OF THE INVENTION

Computers are embedded in nearly every facet of everyday life to include toys and playthings used by even the youngest of children. Typically, a child's interaction with a computerized toy/plaything involves an action/reaction to some activity presented on a display or a screen. In general, it is an adult's creativity that a child reacts to while playing with the toy/plaything. However, this type of play immerses a child in adult-created scenarios and biases, thereby stifling a child's natural creativity that originates in young minds not encumbered with adult experiences and biases.

BRIEF SUMMARY OF THE INVENTION

Accordingly, it is an object of the present invention to provide a method and system for stimulating creative play.

Another object of the present invention is to provide an interactive method and system for generating a fictional story.

In accordance with the present invention, an interactive method and system are provided for generating a fictional story. A user interface receives human speech and transmits machine-generated speech. At least one processor coupled to the user interface is programmed to execute functions that include parsing the human speech into fragments thereof and identifying a primary fragment from the fragments wherein the primary fragment includes a verb. A generalized intent is associated with the verb and at least one object is associated with the generalized intent. The generalized intent and each object associated with the generalized intent are stored in a memory storage. An open-ended question is generated based on the generalized intent wherein the open-ended question is provided to the user interface for transmission as machine-generated speech. The above steps are repeated for a number of cycles, after which a sequence of sentences is generated using each generalized intent and at least one object associated with the generalized intent. The sequence of sentences is transmitted as machine-generated speech from the user interface.

BRIEF DESCRIPTION OF THE DRAWINGS

The summary above, and the following detailed description, will be better understood in view of the drawings that depict details of preferred embodiments.

DETAILED DESCRIPTION OF THE INVENTION

Figure 1:
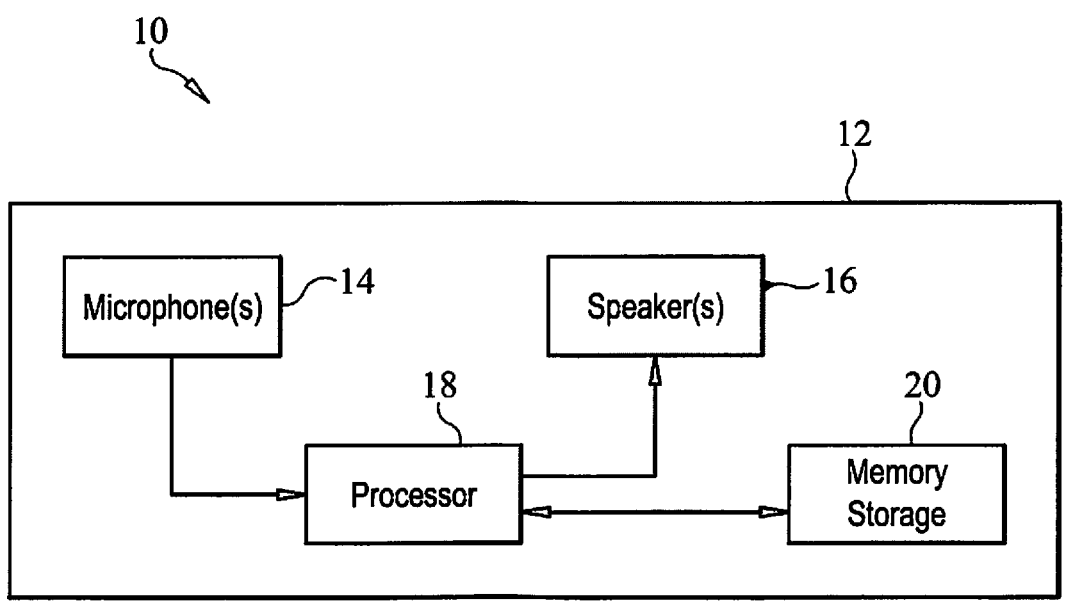
FIG. 1 is a schematic view of a system for generating a fictional story in accordance with an embodiment of the present invention.

Referring now to the drawings and more particularly to FIG. 1, a system for generating a fictional story in accordance with an embodiment of the present invention is shown and is referenced generally by numeral 10. The ensuing description and examples will assume that system 10 would be primarily used by a young child. However, it is to be understood that an older child or adult is not precluded from using and enjoying the present invention. System 10 illustrates a stand-alone system requiring no connectivity to outside hardware or processing elements/systems. Another embodiment of a system implementation will be described later herein that takes advantage of outside system/processing capabilities that can be accessed wirelessly via, for example, an internet connection.

Figure 2:
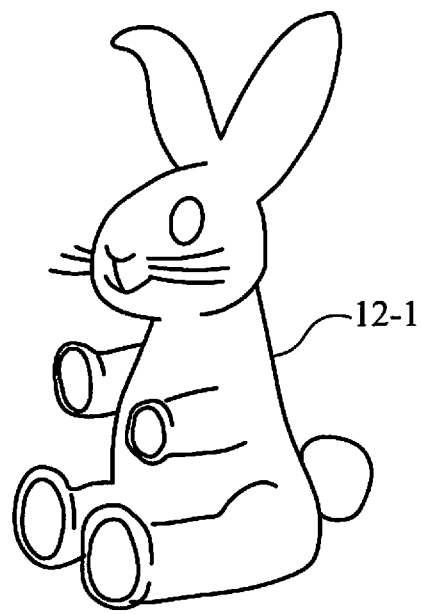
FIG. 2 illustrates an inanimate plaything that can house some or all of the story-generating system in accordance with an embodiment of the present invention.
Figure 3:
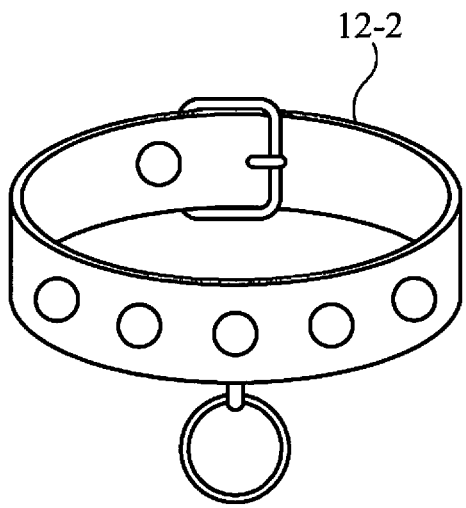
FIG. 3 illustrates a wearable article that can house some or all of the story-generating system in accordance with another embodiment of the present invention.
Figure 4:
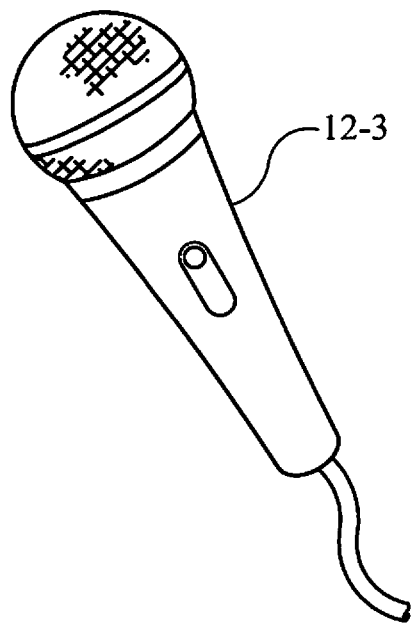
FIG. 4 illustrates a hand-held article that can house some or all of the story-generating system in accordance with another embodiment of the present invention.
Figure 5:
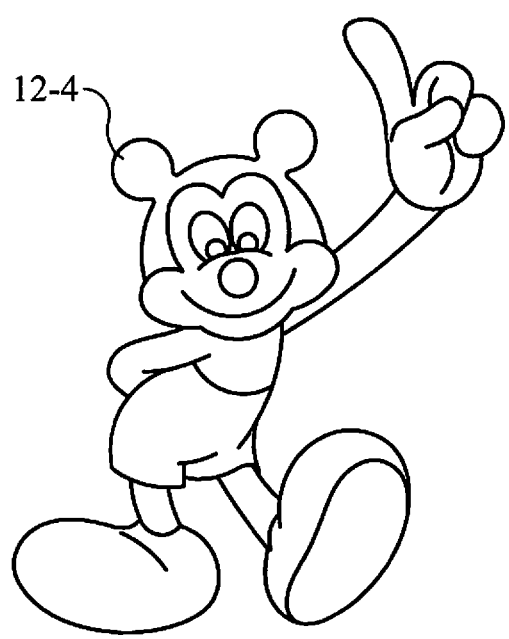
FIG. 5 illustrates a free-standing article that can house some or all of the story-generating system in accordance with another embodiment of the present invention.

System 10 includes a housing 12 that supports and protects one or more microphones 14, one or more speakers 16, a processor 18, and memory storage 20. Although not shown, it is to be understood that power source(s) would be provided to provide power needed to operate system 10 as would be well-understood in the art. Housing 12 can be any of a variety of soft or rigid housings that can support/protect the housed elements and encourage a user's creativity. For example, housing 12 can be a conventional inanimate toy or plaything (e.g., a stuffed animal 12-1 shown in FIG. 2, a doll, a truck, etc.). Housing 12 could also be some type of wearable article (e.g., a pet collar 12-2 shown in FIG. 3 that can be placed on a child's pet, a backpack placed on a child's stuffed animal, etc.). Housing 12 could also be realized by some type of hand-held article (e.g., a replica of a microphone 12-3 shown in FIG. 4, a replica of a book, etc.). Housing 12 could also be a free-standing article such as a statue or figurine 12-4 as shown in FIG. 5.

Microphone(s) 14 and speaker(s) 16 form a user interface that provides for the receiving of human speech and the transmission of machine-generated speech, respectively. The number and type of microphones and/or speakers used in system 10 can be selected and configured for a particular application without departing from the scope of the present invention. Briefly and in general, processor 18 receives/processes human speech sensed by microphone(s) 14, generates questions in response to each occurrence of such human speech where such questions get transmitted from speaker(s) 16 as machine-generated speech, generates a sequence of sentences using information from the human speech and the generated questions, and stores the sequence of sentences in memory storage 20. The stored sequence of sentences define a fictional story that can accessed on-demand using, for example, a human speech command received at microphone(s) 14. The sequence of sentences can then be transmitted as machine-generated speech from speaker(s) 16.

Figure 6:
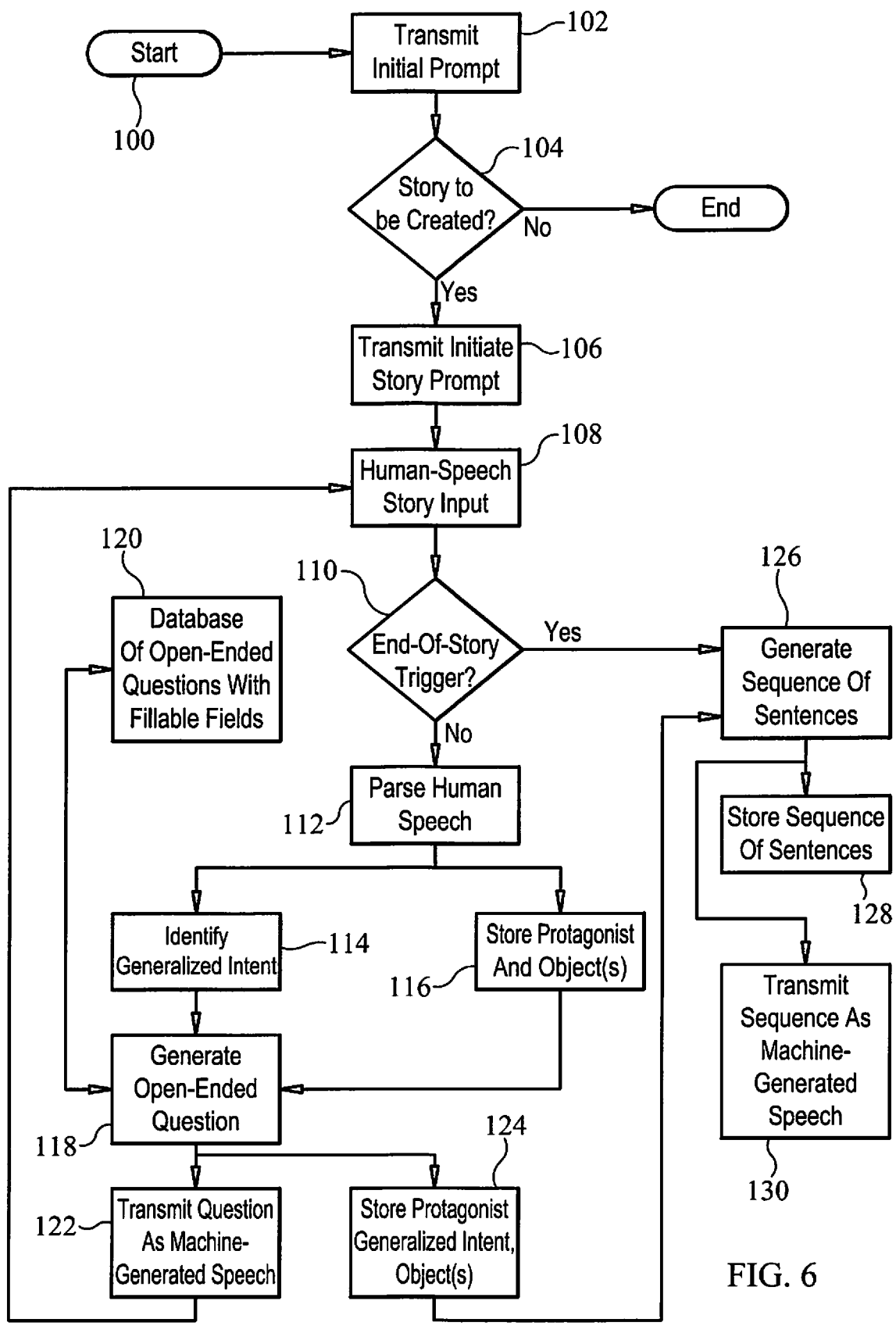
FIG. 6 is a flow diagram of processing functions implemented by the system's processor in accordance with an embodiment of the present invention.

Referring now to FIG. 6, a flow diagram is illustrated of processing functions that would be executed by processor 18 in accordance with an embodiment of the present invention. Processing commences with a start function step 100 that can be realized by the recognition of a position of a power on/off switch, a specific human speech "trigger" recognized by processor 18 (e.g., phrases such as "turn on", "story time", etc.), or a generalized human speech "trigger" such as a sound level threshold indicating that a user is addressing system 10. Start function step 100 could embody more than one of these functions or different functions without departing from the scope of the present invention.

In response to start function step 100, processor 18 can automatically issue a prompt at step 102 in the form of machine-generated speech transmitted from speaker(s) 16. Prompt 102 can be a simple question such as "Do you want to create a story?" where the specific language of prompt 102 is not a limitation of the present invention. Processor 18 evaluates the user's response to prompt 102 at step 104 where a "NO" response can be indicated by some positive human speech response or the lack of a response triggering a timing out situation. Either way, a "NO" response ends processing. However, a "YES" response determination at step 104 begins the present invention's story-generation cycle. A "YES" response can be indicated by a variety of human speech responses without departing from the scope of the present invention.

Assuming a "YES" response is indicated at prompt evaluation step 104, processor 18 issues an initiate story prompt at step 106 in the form of machine-generated speech transmitted from speaker(s) 16. Story prompt 106 can be a question designed to illicit a response that identifies the story's protagonist. Accordingly, story prompt 106 can be a simple question such as "Who is this story about?" However, it is to be understood that other forms of a question (e.g., "What is the story about?") to illicit a protagonist could be used without departing from the scope of the present invention.

Microphone(s) 14 are monitored for receipt of a human-speech story input at step 108. Received human speech is evaluated at end-of-story trigger step 110 to determine if the human speech is indicative of a user's intent to start/continue with the story-generation process or end the story-generation process. Evaluation of a user's intent will be described further below. However, at this point in the description, it is sufficient to say that a user's intent to start/continue with the story-generation process causes processing to execute a parse human speech step 112 whereas a user's intent to end the story-generation process causes processing to generate a sequence of sentences at step 126 as will be described later below. For now, it will be assumed that the human speech is indicative of the intent to start/continue with the story-generating process.

At parse human speech step 112, the received human speech is split up into fragments thereof based on the speech's verb content and, if present in the speech, the speech's indication of a protagonist (generally received in response to story prompt 106) and the speech's noun content. The parsing of human speech into its constituent fragments is known in the art. For example, an exemplary parsing code (for programming into processor 18) is the Stanford Parser commercially available from Stanford NLP Group, Stanford, Calif. For embodiments of the present invention accessing third party providers as will be explained further below, parsing of human speech can be accomplished by calls to IBM WATSON, IBM Corp, New York. The verb fragment(s) are processed at step 114 to identify or associate/assign a generalized intent with the verb fragment(s). For example, if the human speech generated in response to story prompt 106 and received at parsing step 112 was the phrase/sentence "A bunny drinks coffee," the verb fragment "drinks" could be generalized at step 114 to be associated with more generalized actions or verbs/intents such as "eat" or "consume". Since the human speech will generally have a verb or intent imbedded therein, intent generalization step 114 is at the core of the present invention's story-generation process that encourages imagination in the child/user.

Assuming the parsed speech from step 112 includes noun-based fragment(s), the protagonist and nouns (or object of the intent as they will also be referenced to herein) can be stored in memory storage 20 at step 116. Memory storage 20 will be provided with a database of protagonists and nouns/objects such that step 116 increases the volume of stored nouns/objects if the noun/object parsed in step 112 does not already exist in memory storage 20. For the illustrated example above, the word "bunny" would be identified as the protagonist and "coffee" would be identified as an object.

Next, at step 118, processor 18 executes a function that generates an open-ended question using, at a minimum, the generalized intent from step 114. As used herein, an "open-ended question" is one that does not illicit a YES/NO response or does not contain the answer in the question (e.g., "Is the drink hot or cold?"). For example, using the above human speech "A bunny drinks coffee", step 118 could generate an open-ended question that encourages the imagination of the child/user. For example, step 118 could use just the generalized intent "eat" to formulate an open-ended question such as "What are they eating?" In addition, generate question step 118 could also incorporate the protagonist and/or the noun/object determined by parsing step 112, to formulate an open-ended question such as "Why is bunny drinking?" Still further, generate question step 118 could incorporate the noun/object determined by parsing step 112 and one (or more nouns/objects) stored in memory storage 20 to formulate a more complex open-ended question such as "What is bunny eating while drinking coffee?"

System 10 can be designed and configured such that the complexity of the open-ended question generation is always simple, always complex, or fluctuates between simple and complex throughout the story-generating process without departing from the scope of the present invention. Further, the selection of nouns/objects could be randomized within a grouping of associated nouns/objects or even throughout the database of nouns/objects in order to generate a question that further motivates creativity. Still further, generate question step 118 can include programming to associate an additional intent with the generalized intent to formulate a question such as "What is bunny wearing while drinking coffee?" Accordingly, it is to be understood that generate question step 116 can include one or more of the above-described techniques without departing from the scope of the present invention.

By way of an illustrative example, open-ended question generation step 118 can access a database 120 storing open-ended questions with each such question having fixed terms and at least one fillable field where each such fillable field is identified as being one of a protagonist, an intent, or an object. The fixed terms can comprise a wide variety of terms that, when combined with one or more of the fillable fields, form an open-ended question. In an exemplary embodiment, step 118 initiates a search of database 120 in order to search for matches based on criteria that include one or more of the intent, generalized intent, object(s), and protagonist determined as described above. One of the stored questions satisfying the search criteria is then selected. For example, selection of a question satisfying the search criteria can incorporate a random selection process.

The question generated at step 118 is processed such that it can be transmitted by speaker(s) 16 in a machine-generated speech form thereof at transmit step 122. The conversion of the generated speech into machine-generated speech is well-understood in the art and will, therefore, not be described further herein. The protagonist, generalized intent information, and the object information (e.g., from parsing step 112 and/or stored in memory storage 20) is stored at step 124 in, for example, memory storage 20.

Following transmit step 122, the above-described process loops back to monitoring for receipt of a human-speech input 108 and will continue until human-speech input 108 is indicative of an end-of-story trigger detected at step 110. Human speech indicative of an end-of-story trigger could be explicit (e.g., "I am done", "I am finished", "No more", "The end", etc.) or implicit (e.g., a response indicating that the protagonist is happy). Once end-of-story trigger step 110 determines the user is finished with story-generating human speech inputs, processing continues with step 126 where a sequence of sentences is generated.

Sentence generation step 126 accesses the stored protagonist, intents, and objects from step 124 to generate a sequence of sentences that form a fictional story. Sentence generation can rely solely on the intents/objects collected and/or selected during the above-described input-to-question cycle. However, in order to enhance sentence generation, additional associated intents/objects can be included from steps 114 and 116.

The generated sequence of sentences (i.e., the generated fictional story) is stored in memory storage 20 at step 128. Simultaneously, the sequence of sentences can be transmitted by speaker(s) 16 in a machine-generated speech form thereof at transmit step 130. Storage step 128 can include a naming function that allows a user to give the story a title that will be stored in association with the stored sequence of sentences. In this way, a user could access/recall the stored sequence of sentences on-demand for re-transmission as machine-generated speech. Such access/recall could be indicated by the user speaking the title for interpretation by system 10. Such access/recall could be triggered by keywords such as "Tell me the (blank) story" where the "(blank)" can be a character, intent, and/or object in the stored title.

Figure 7:
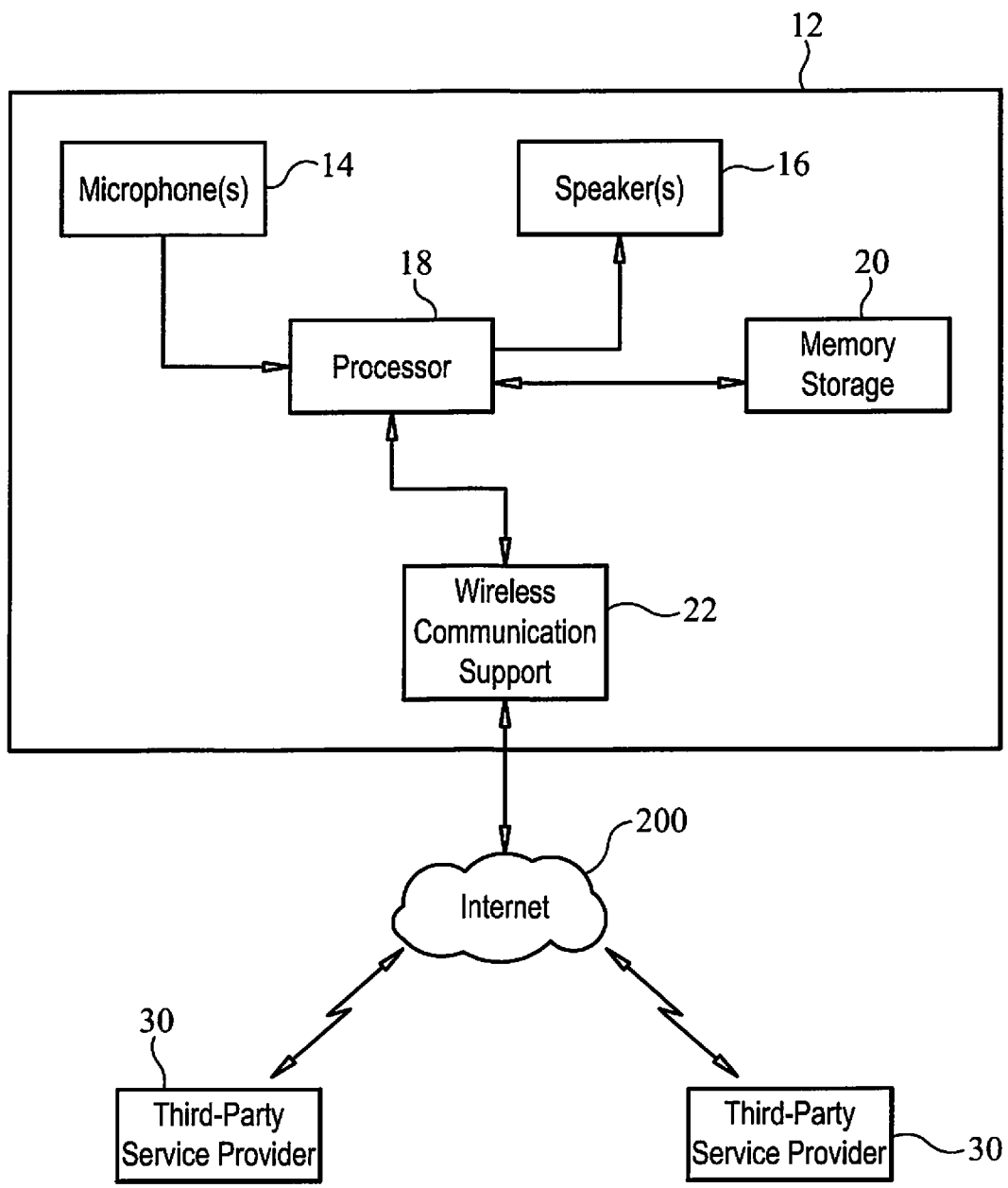
FIG. 7 is a schematic view of an internet-connected system for generating a fictional story in accordance with another embodiment of the present invention.

As mentioned above, the story-generation method of the present can also be realized by a system having internet connectivity such that the system can utilize more advanced processing resources. An exemplary internet-based system is illustrated in FIG. 7 where the above-described housing 12 further houses/supports wireless communications support 22 coupled to its onboard processor 18. Wireless communications support 22 can be any device or system that provides the means to access the internet 200, the choice of which is not a limitation of the present invention. Such wireless communications are well-known in the art and will not be described further herein. The internet-based system shown in FIG. 7 contemplates access to one or more third-party service providers 30 capable of providing enhanced or complex processing load on processor 18. For example, service providers 30 can include IBM Corp (e.g., IBM WATSON computer), Google (e.g., voice recognition app), and Amazon (e.g., the Polly app for conversion of text to speech).

Figure 8:
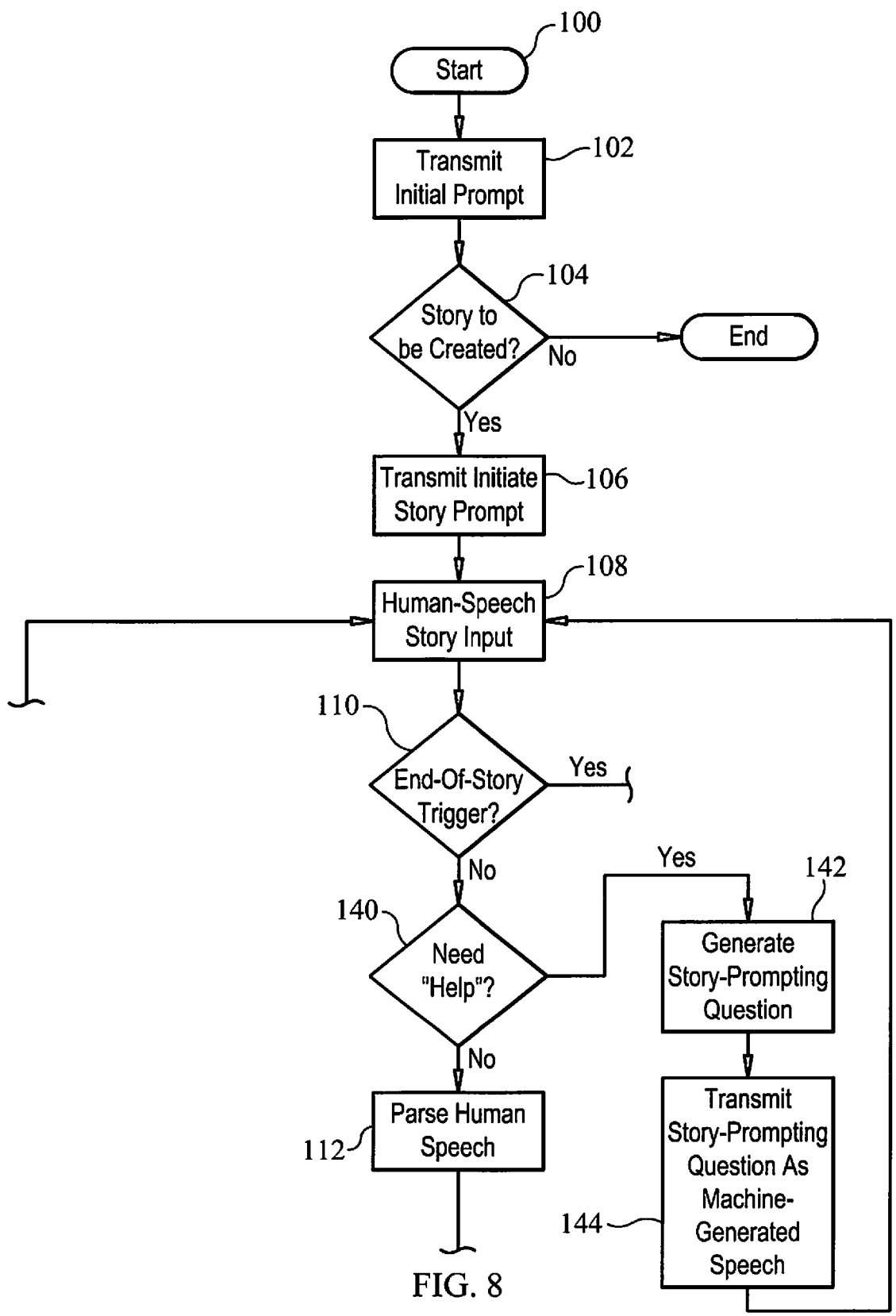
FIG. 8 is a flow diagram of story prompting steps in accordance with another embodiment of the present invention.

Since there may be times that a child/user needs help getting started with the above-described story-generating cycle, the present invention's processor can be programmed to execute a story concept prompting function that will be explained with the aid of FIG. 8. In FIG. 8, a portion of the flow diagram depicted in FIG. 6 is reproduced with the addition of function steps 140-144. More specifically, assuming that no end-of-story trigger is detected at step 110, step 140 evaluates the human speech to determine if story-generating help is needed. A request for help can be explicit in the human speech input (e.g., the word "help" is detected) or implicit in the human speech input (e.g., "I don't know", speech-pause phrases/sounds such as "ummmm", etc.). If no help is needed, parsing step 112 proceeds as described above. If help is needed, story-prompting question generating step 142 is invoked where one of a number of story-prompting leading questions is generated. The story-prompting leading-question framework can be stored on local memory storage 20 and/or at a third-party service provider 30 without departing from the scope of the present invention. The generated story-prompting leading question can be in the form of a simple or complex combination of verb/intent and noun/object passed to transmit question step 144 in order to encourage a human speech response that allows the story generation process to continue. Following transmit step 144, monitoring for receipt of human-speech input 108 proceeds as described above.

By way of an illustrative example, the story-prompting leading questions can be segregated into levels where top level questions are designed to lead a child/user towards a type of answer and subsequent level(s) are increasingly more leading by including a potential answer in the question. Step 142 initially generates a top level question to encourage imagination from the child/user. Such top level questions are leading questions based on a single one of the protagonist, generalized intent, or object previously specified or determined. If the top level question transmitted at step 144 receives another human-speech input 108 indicative of the child/user needing "help" (e.g., an "I don't know" response), step 142 proceeds to generate a second or lower level question that is in the form of a more leading question that also includes a potential answer to the question thereby aiding the story generation process.

By way of non-limiting examples, top level leading questions could be phrased as follows:
"Can you think of who is with [protagonist]?"
"Can you think of something about [object]?"
In each example, the bracketed term is a fillable field filled in using, for example, previously-identified information. In each question, the child is led towards giving an answer related to the protagonist or object, respectively. Second or lower level leading questions could be phrased as follows:
"Maybe [protagonist] [generalized intent] [object]?"
"Maybe [protagonist] [intent related to generalized intent]?"
Applying these types of leading questions to the "A bunny drinks coffee" example referred to above, two leading questions based on the framework above might be realized as follows:
"Maybe bunny drinks in a donut shop?"
"Maybe bunny eats a donut with coffee?"

In each of these second level leading questions, a potential answer is presented in the question in order to give the child/user an easier way to advance the story generation process.

When a toy, stuffed animal, etc., is used as the above-described housing 12, the present invention can be further enhanced by allowing the inputs used for machine-generated speech to also serve as a trigger for the initiation of movements of the housing. For example, if the toy is a stuffed animal, machine-generated questions could be posed while simultaneously being used to initiate gestures generally associated with someone asking a question. Other gestures indicative of happiness, empathy, surprise, etc., could also be used and be based on the nature of the machine-generated speech input.

The advantages of the present invention are numerous. The method and system blend old-fashioned child creativity and play toys with new technology in a way that fosters a child's imagination. The present invention can be embodied in stand-alone devices or in devices utilizing internet connectivity to support enhanced product applications.

INCORPORATION BY REFERENCE

All publications, patents, and patent applications cited herein are hereby expressly incorporated by reference in their entirety and for all purposes to the same extent as if each was so individually denoted.

EQUIVALENTS

While specific embodiments of the subject invention have been discussed, the above specification is illustrative and not restrictive. Many variations of the invention will become apparent to those skilled in the art upon review of this specification. The full scope of the invention should be determined by reference to the claims, along with their full scope of equivalents, and the specification, along with such variations.

I claim:

1. An interactive method for generating a fictional story, comprising the steps of:
   providing a user interface to include at least one microphone for receiving human speech and at least one speaker for transmitting machine-generated speech;
   providing at least one processor coupled to said user interface and programmed to execute one or more functions comprising monitoring said user interface for human speech Indicative of generated story inputs;
   parsing said human speech indicative of generated story inputs into fragments thereof;
   identifying a primary fragment from said fragments wherein said primary fragment includes a verb;
   associating a generalized intent with said verb and associating at east one object with said generalized intent;
   storing said generalized intent and each said object associated with said generalized intent;
   generating an open-ended question based on said generalized intent, said object, and protagonist, said open-ended question containing no answer and does not elicit a yes/no response, wherein said open-ended question is generated based on a randomized selection of an object within said grouping of associated objects of said object, wherein said open-ended question is provided to said user interface for transmission as said machine-generated speech;
   repeating, for a plurality of cycles, said steps of monitoring, parsing, identifying, associating, storing, and generating;
   generating, following said step of repeating, a sequence of sentences forming a story, using each said generalized intent and at least one of said object associated with said generalized intent and based on said generated open-ended questions; and
   transmitting said sequence of sentences as said machine-generated speech from said user interface.

2. An interactive method as in claim 1, wherein said at least one processor is wirelessly accessed.

3. An interactive method as in claim 1, further comprising the step of ceasing said step of repeating in response to a stop signal wherein said stop signal is received via said human speech.

4. An interactive method as in claim 1, wherein said user interface is housed in an item selected from the group consisting of a plaything, a wearable article, a hand-held article, and a free-standing article.

5. An interactive method as in claim 1, wherein said at least one object comprises an object included in one of said fragments.

6. An interactive method as in claim 5, wherein said open-ended question includes said object included in one of said fragments.

7. An interactive method as in claim 1, wherein said at least one object comprises a plurality of predefined objects associated with said generalized intent.

8. An interactive method as in claim 7, wherein said open-ended question includes one of said predefined objects.

9. An interactive method as in claim 1, wherein said at least one object comprises:
   an object included in one of said fragments; and
   a plurality of predefined objects associated with said generalized intent.

10. An interactive method as in claim 9, wherein said open-ended question includes one of said object included in one of said fragments and one of said predefined objects.

11. An interactive method as in claim 1, further comprising the steps of:
   storing said sequence of sentences in a database accessible via said user interface;
   accessing said sequence of sentences stored in said database on-demand using said human speech; and
   retransmitting, following said step of accessing, said sequence of sentences as said machine-generated speech from said user interface.

12. An interactive method as in claim 1, further comprising the step of generating a leading question when said generalized intent is indicative of a request for help in generating the fictional story, wherein said leading question includes at least one of said generalized intent and said object associated with said generalized intent.

13. An interactive method as in claim 12, wherein an answer to said leading question is included in said leading question.

14. An interactive method for generating a fictional story, comprising the steps of:
   providing a user interface to include at least one microphone for receiving human speech originating at a location proximal to said user interface and at least one speaker for transmitting machine-generated audible speech at said location;
   providing at least one processor accessible to said user interface via an internet connection, said at least one processor programmed to execute one or more functions comprising monitoring said user interface for human speech indicative of generated story inputs;
parsing said human speech indicative of generated story inputs into fragments thereof;
identifying a primary fragment from said fragments wherein said primary fragment includes a verb;
associating a generalized intent with said verb and associating at least one object with said generalized intent;
storing said generalized intent and each said object associated with said generalized intent;
generating an open-ended question based on said generalized intent, said object, and protagonist, said open-ended question containing no answer and does not elicit a yes/no response, wherein said open-ended question is generated based on a randomized selection of an object within said grouping of associated objects of said object, wherein said open-ended question is provided to said user interface for transmission as said machine-generated speech;
repeating, for a plurality of cycles, said steps of monitoring, parsing, identifying, associating, storing, and generating;
ceasing said step of repeating in response to a stop signal wherein said stop signal is received via said human speech;
generating, following said step of repeating, a sequence of sentences forming a story, using each said generalized intent and at least one of said object associated with said generalized intent and based on said generated open-ended questions; and
transmitting said sequence of sentences as said machine-generated audible speech from said user interface.

15. An interactive method as in claim 14, wherein said user interface is housed in an item selected from the group consisting of a plaything, a wearable article, a hand-held article, and a free-standing article.

16. An interactive method as in claim 14, wherein said at least one object comprises an object included in one of said fragments.

17. An interactive method as in claim 16, wherein said open-ended question includes said object included in one of said fragments.

18. An interactive method as in claim 14, wherein said at least one object comprises a plurality of predefined objects associated with said generalized intent.

19. An interactive method as in claim 18, wherein said open-ended question includes one of said predefined objects.

20. An interactive method as in claim 14, wherein said at least one object comprises:
an object included in one of said fragments; and
a plurality of predefined objects associated with said generalized intent.

21. An interactive method as in claim 20, wherein said open-ended question includes one of said object included in one of said fragments and one of said predefined objects.

22. An interactive method as in claim 14, further comprising the steps of:
storing said sequence of sentences in a database accessible via said user interface;
accessing said sequence of sentences stored in said database on-demand using said human speech; and
retransmitting, following said step of accessing, said sequence of sentences as said machine-generated audible speech from said user interface.

23. An interactive method as in claim 14, further comprising the step of generating a leading question when said generalized intent is indicative of a request for help in generating the fictional story, wherein said leading question includes at least one of said generalized intent and said object associated with said generalized intent.

24. An interactive method as in claim 23, wherein an answer to said leading question is included in said leading question.

25. An interactive system for generating a fictional story, comprising:
a user interface to include at least one microphone adapted to receive human speech and at least one speaker adapted to transmit machine-generated speech;
at least one processor coupled to said user interface; a database coupled to said at least one processor; and
said at least one processor programmed to execute one or more functions comprising:
monitoring said user interface for human speech indicative of generated story inputs;
parsing said human speech indicative of generated story inputs into fragments thereof,
identifying a primary fragment from said fragments wherein said primary fragment includes a verb,
associating a generalized intent with said verb and associating at least one object with said generalized intent,
storing, in said database, said generalized intent and each said object associated with said generalized intent,
generating an open-ended question based on said generalized intent, said open-ended question having no correct answer, wherein said open-ended question is provided to said user interface for transmission as said machine-generated speech,
generating an open-ended question based on said generalized intent, said object, and protagonist, said open-ended question containing no answer and does not elicit a yes/no response, wherein said open-ended question is generated based on a randomized selection of an object within said grouping of associated objects of said object, wherein said open-ended question is provided to said user interface for transmission as said machine-generated speech;
repeating, for a plurality of cycles, said steps of monitoring, parsing, identifying, associating, storing, and generating,
generating, following said step of repeating, a sequence of sentences forming a story, using each said generalized intent and at least one of said object associated with said generalized intent and based on said generated open-ended questions; and
providing said sequence of sentences to said user interface wherein said sequence of sentences are reproduced as said machine-generated speech transmitted from said user interface.

26. An interactive system according to claim 25, wherein said at least one processor is wirelessly coupled to said user interface.

27. An interactive system according to claim 25, wherein said at least one processor ceases said function of repeating in response to a stop signal wherein said stop signal is received via said human speech.

28. An interactive system according to claim 25, further comprising a housing for said user interface, said housing being selected from the group consisting of a plaything, a wearable article, a hand-held article, and a free-standing article.

29. An interactive system according to claim 25, wherein said at least one object comprises an object included in one of said fragments.

30. An interactive system according to claim 29, wherein said open-ended question includes said object included in one of said fragments.

31. An interactive system according to claim 25, wherein said at least one object comprises a plurality of predefined objects associated with said generalized intent.

32. An interactive system according to claim 31, wherein said open-ended question includes one of said predefined objects.

33. An interactive system according to claim 25, wherein said at least one object comprises:
- an object included in one of said fragments; and
- a plurality of predefined objects associated with said generalized intent.

34. An interactive system according to claim 33, wherein said open-ended question includes one of said object included in one of said fragments and one of said predefined objects.

35. An interactive system according to claim 25, further comprising a story database accessible from said user interface, wherein said at least one processor stores said sequence of sentences in said story database and provides said sequence of sentences stored in said story database on-demand as requested by said human speech wherein said sequence of sentences is reproduced as said machine-generated speech transmitted from said user interface.

36. An interactive system as in claim 25, wherein said at least one processor is further programmed to execute a function of generating a leading question when said generalized intent is indicative of a request for help in generating the fictional story, wherein said leading question includes at least one of said generalized intent and said object associated with said generalized intent.

37. An interactive system as in claim 36, wherein an answer to said leading question is included in said leading question.

* * * * *